United States Patent [19]

Kratochvil et al.

[11] Patent Number: 5,316,783
[45] Date of Patent: May 31, 1994

[54] PARBOILED RICE PRODUCT AND METHOD OF MAKING SAME

[75] Inventors: Cynthia P. Kratochvil, Seabrook; Yah Hwa E. Lin, Houston; Thomas J. Novak, Kingwood, all of Tex.

[73] Assignee: Uncle Ben's, Inc., Houston, Tex.

[21] Appl. No.: 979,809

[22] Filed: Nov. 20, 1992

[51] Int. Cl.$^5$ .............................................. A23L 1/182
[52] U.S. Cl. ................................... 426/627; 426/455; 426/456; 426/460; 426/461; 426/462; 426/465; 426/618
[58] Field of Search ............... 426/449, 455, 456, 460, 426/461, 462, 618, 465, 627

[56] References Cited

U.S. PATENT DOCUMENTS

| | | | |
|---|---|---|---|
| 1,391,696 | 9/1921 | Saunders | 426/462 |
| 3,086,867 | 4/1963 | Miller | 426/450 |
| 3,164,475 | 1/1965 | Willock | 426/462 |
| 4,233,327 | 11/1980 | Ando et al. | 426/242 |
| 4,338,344 | 7/1982 | Brooks et al. | 426/461 |
| 4,361,593 | 11/1982 | Brooks et al. | 426/627 |
| 4,442,130 | 4/1984 | Autrey et al. | 426/462 |
| 4,473,593 | 9/1984 | Sturgeon | 426/462 |
| 4,649,055 | 3/1987 | Kohlwey | 426/449 |
| 4,761,297 | 8/1988 | Sugisawa et al. | 426/618 |
| 4,794,012 | 12/1988 | Taniguchi et al. | 426/462 |
| 4,810,511 | 3/1989 | Velupillai et al. | 426/242 |
| 4,952,416 | 8/1990 | Abraham et al. | 426/462 |
| 5,017,395 | 5/1991 | McCaskill et al. | 426/459 |

FOREIGN PATENT DOCUMENTS 2184932 7/1987 United Kingdom .

OTHER PUBLICATIONS

Kshirod Ranjan Bhattacharya, "Parboiling of Rice", pp. 289–348, in Rice—Chemistry and Technology, edited by Bienvenido O. Juliano (St. Paul) 1985.

Kshirod R. Bhattacharya et al., "Changes in Rice during Parboiling, and Properties of Parboiled Rice", pp. 105–167, in Advances in Cereal Science and Technology, vol. VII, edited by Y. Pomeranz (St. Paul) 1985.

P. Pillaiyar et al., Journal of Food Science and Technology, vol. 14, pp. 226–227, Sep.–Oct. 1977.

Bor S. Luh et al., "Parboiled Rice", pp. 51–88, in Rice—Production and Utilization, 2d edition, edited by Bor S. Luh (New York) 1991.

S. Zakiuddin Ali et al., Journal of Food Process Engineering 4, pp. 123–136, 1980.

N. G. C. Iengar et al., "Studies on Sand Parboiling and Drying of Paddy", J. Agril. Engg., vol. VIII, No. 2, pp. 51–54.

A. U. Khan et al., "Accelerated Drying of Rice using Heat-Conduction Media", Transactions of the ASAE, pp. 949–955, 1974.

Toshizo Ban, "Rice Cracking in High Rate Drying", JARQ, vol. 6, No. 2, pp. 113–116, 1971.

United States Standards for Rice, United States Department of Agriculture, Federal Grain Inspection Service, Washington, D.C., effective Jul. 1, 1989.

B. S. Vasan et al., "Use of Hot Air for Parboiling and Drying of Paddy", Journal of Food Science and Technology, vol. 17, pp. 246–247, Sep.–Oct. 1980.

Primary Examiner—Helen F. Pratt
Attorney, Agent, or Firm—Curtis, Morris & Safford

[57] ABSTRACT

Parboiled rice having the beneficial properties of parboiled rice, such as intact grain structure and texture, and having improved color vis-a-vis a typical parboiled rice, and further in the case of a brown rice starting material being substantially without the characteristic parboiled flavor and color, and methods of making same.

18 Claims, No Drawings

PARBOILED RICE PRODUCT AND METHOD OF MAKING SAME

FIELD OF THE INVENTION

The present invention relates to parboiled rice and to processes for its preparation.

BACKGROUND OF THE INVENTION

Parboiled rice is usually defined as rice which has been steeped, heat treated and dried. During the heat treatment step of parboiling, the starch in the endosperm of the rice is substantially gelatinized. The parboiling process and the resulting gelatinization of the starch have several beneficial effects.

First, rice is routinely parboiled to achieve a better milling yield (less broken rice). Less broken rice has significant economic and quality consequences; whole rice commands a higher price because whole grains are valued by consumers of rice as high quality. Upon cooking, a rice with less brokens is generally accepted world-wide as having a more pleasing appearance.

Parboiling also causes a very important second quality change, which becomes evident upon cooking. Cooked parboiled rice grains are significantly more intact and retain their natural shape as compared to non-parboiled rice. In selected rice eating cultures of the world, this is viewed as a quality improvement over non-parboiled rice.

Also, during the parboiling process, the rice grain is strengthened to impart increased resistance to the rigors of abrasive milling. (Unparboiled rice easily shatters.) The strengthening of the grain is manifest in the cooked finished product. The rice is so strengthened by parboiling that it typically takes somewhat longer to cook during preparation by consumers than does unparboiled rice. Furthermore, parboiled rice often has a firmer texture and is less sticky than unparboiled rice. Even with the cooktime increase, these changes make parboiled rice more attractive than unparboiled rice in selected cultures around the world.

Parboiling of rice apparently originated, principally, in India. In the early history of parboiling, the rough (paddy) rice was simply soaked in warm water overnight and then dried in the sun. The perceived benefit was that the rice hulls were split open and were thus easily removed from the rice kernel. In modern times, it has been realized that parboiling also provides a more nutritional rice as thiamine and other essential nutrients, which are normally present in the rice bran, migrate to the rice endosperm during the water steeping or soaking step. Since almost all rice is milled to remove the bran, this migration preserves at least some of the nutritional value initially contained in the bran. Parboiling is also beneficial since the starch in the rice endosperm is changed from a partially crystalline-partially amorphous state to a substantially amorphous state. With the starch in the amorphous state, the kernel is tougher, resulting in a higher yield of whole rice kernels after milling. As mentioned earlier, unparboiled (crystalline) rice easily shatters. Gelatinization via parboiling, simply put, is the water-assisted melting of starch granules upon heat treatment. The presence of too much or too little water when heat is applied to the starch can have beneficial or deleterious results. Another significant benefit of parboiling is that the lipase in the bran layer of brown rice becomes inactivated due to the heat treatment. This improves the shelf life of parboiled brown rice by reducing the tendency for oxidative rancidity.

As a rule of thumb, prior parboiling practices can be divided into three broad categories: the "atmospheric steaming" method, the "dry-heat" method and the "pressure-steaming" method. The atmospheric steaming method comprises soaking, draining, and steaming at atmospheric pressure, followed by drying and milling stages. The dry-heat method replaces the steaming step of the conventional method with a heating stage in which the rice is cooked in dry-hot air, hot non-aqueous liquids or hot sand prior to drying. Sometimes, the hot dry heat media are replaced by electromagnetic energy heating, such as microwave heating. In all cases with the dry heat method, the use of water or steam is avoided. The consequences of avoiding the use of water will become apparent later in the text. Finally, the pressure-steaming method comprises a low-moisture initial soak followed by pressurized steaming prior to drying and milling.

Today, commercial parboiling processes generally include the steps of: (I) soaking rough (or paddy) rice in 50°-70° C. water for 3-4 hours to yield a rough rice having a 30 weight percent water content; (2) draining the free water from the soaked rice; (3) applying steam heat under pressure for 10 to 20 minutes to effect gelatinization; and (4) drying the steamed rice with hot air to reduce its water content to about 14 weight percent water. The dried, parboiled rough rice is then ready for shelling (to remove the hull) and milling to remove the bran.

Parboiling has been an active topic in the patent literature. There have been numerous efforts to improve upon the basic technology. For example, U.S. Pat. No. 5,017,395 teaches an extra predrying step at an elevated temperature. U.S. Pat. No. 4,810,511 prescribes use of microwave energy for partial gelatinization. According to U.S. Pat. No. 4,361,593, the rice starch is not completely gelatinized during steaming, and a tempering step is performed under non-gelatinizing conditions to reduce subsequent rupturing. In U.S. Pat. No. 4,338,344, there is disclosed an inclined enclosed chamber where rice is cooked in hot water in a first zone at a lower end, and then is steamed in a second zone at an upper end.

Unfortunately, despite these treatments, two undesirable conditions persist: conventional processes cause parboiled rice to be yellow and to develop a characteristic "parboiled" flavor in appreciable part due to Maillard-browning effects (and also in part as a result of the effects of agents contained in the rice hull when using paddy rice). To many cultures and consumers, these conditions are objectionable. In fact, many consumers believe that the yellow color and parboiled flavor signify that the rice is old and stale. This is important because, as widely accepted in culinary arts, the first impression of a food is generally visual. That is, the willingness of a person to eat a particular food depends largely on preconceptions as to appealing color and other visual cues. Color is an influential quality attribute pre-supposed by people to be an indicator of deteriorative changes undergone by food. Aroma and flavor can also be influential upon smelling and tasting. Thus, an off-color, increases the likelihood that a food will be rejected, and this phenomenon jeopardizes the acceptability of parboiled rice amongst the majority of rice eating cultures around the world. This is so to an even greater extent if the rice has a foreign flavor. It is desired that rice color be near-white and that rice flavor be near bland and subtle.

Only a relatively small group of consumers of conventional parboiled rice accept its appearance and flavor. Indeed, the overwhelming majority of rice consumers, worldwide, eat non-parboiled rice. To our knowledge, none of the prior parboiling practices has resulted in a rice which combines the beneficial features of parboiled rice such as intact grain structure with an improved color vis-a-vis that exhibited by typical parboiled rice. This is especially true of such a rice having those advantages and being substantially free from typical parboiled flavor and color. Provision of a parboiled rice product having a full complement of advantageous features without one or more of the common shortcomings would be a substantial advance over the technology discussed heretofore.

OBJECTS OF THE INVENTION

Accordingly, it is an object of the invention to provide an improved parboiled rice product.

It is an additional object of the invention to provide a parboiled rice product which has all the advantages of conventional parboiled rice.

It is another object of the invention to provide a parboiled rice product which has improved color vis-a-vis that of typical parboiled rice.

It is yet another object of the invention to provide a parboiled rice product which has improved flavor vis-a-vis that of typical parboiled rice.

It is still another object of the invention to provide a method for the preparation of the above-mentioned parboiled product.

These and other objects of the invention will be readily apparent from the following description and claims.

SUMMARY OF THE INVENTION

In one aspect, the invention is a parboiled rice product which comprises a rice grain having an intact grain structure and a gelatinous kernel which is substantially non-crystalline, said rice product being substantially free of Maillard-browning effects, without the need for the rice grain's exposure to counterbrowning agents or counterbrowning measures to effect said freedom from Maillard-browning effects.

In another aspect, the invention is a method for the preparation of parboiled rice, which comprises (a) steeping brown rice to a moisture content sufficiently high that the rice starch is capable of being substantially fully gelatinized; and (b) exposing the rice to a hot gaseous medium flow at a temperature and for a time such that the rice starch is gelatinized and the surface of the rice is dried in substantial part.

As described, the rice of the invention has the beneficial properties of parboiled rice, such as intact grain structure and texture, and further has improved color vis-a-vis that of typical parboiled rice. Furthermore, in the case of a rice product made from a brown rice starting material, the rice product is substantially free of browning effects and parboiled flavor. This is achieved with the present invention because gelatinization is effected so rapidly that those agents which cause Maillard-browning, and in the case of brown rice those agents which cause other browning effects also and/or which impart parboiled flavor, do not have a chance to develop to any substantial extent. In particular, the use of brown rice avoids the transfer of paddy-hull solubles, which cause both undesirable color and flavor.

DESCRIPTION OF CERTAIN PREFERRED EMBODIMENTS

In accordance with the present invention, then, a parboiled rice product is obtained from paddy rice or brown rice. Even with paddy rice, the invention confers substantial property benefits, such as intact grain structure, substantial gelatinization and substantial freedom from Maillard-browning effects. However, the use of brown rice for parboiling, rather than paddy rice, offers yet additional and substantial advantages. It is an important feature of the invention that its practitioner, while utilizing brown rice, can simultaneously achieve intact grain structure and a gelatinous kernel which is substantially non-crystalline, with substantial freedom from paddy hull solubles and browning effects, without the need for the rice's exposure to counterbrowning agents or counterbrowning measures to effect said freedom from browning effects.

Importantly, it is an additional feature of the invention that brown rice can be parboiled using hot air or steam. This is surprising, as one would have expected brown rice to be an unfavorable starting material for several reasons. By way of explanation, paddy rice is normally used in parboiling since the rice hull acts like a pressure vessel and a moisture barrier Brown rice has no hull When parboiling with hot air, there is no moisture loss barrier to retain moisture during gelatinization, which would tend to discourage its use as a starting material especially with hot air at atmospheric pressure. When parboiling with steam, since brown rice has no hull, there is no moisture pick-up barrier which would tend to discourage its use as a starting material with steam. This moisture pick-up can result in severe handleability problems and render the process impractical.

The maintenance of "intact grain structure" is of great importance. The term refers to that condition in which, upon hydration, as in cooking, the rice grain is capable of maintaining its natural shape and structural integrity. This minimizes or eliminates two major defects which non-intact cooked grains can have, to varying degrees. These are split grain appearance and ragged surface appearance. A rice grain or kernel after hydration, as in cooking, is considered as not having an intact structure when the dorsal and ventral sides are swollen and/or essentially split open such that the surfaces and edges appear curly and ragged. Eventually, if the grain is allowed to hydrate more and more, it assumes an almost x-shaped structure, sometimes referred to as being "butterflied". A grain which does not have intact structure may also be characterized simply as a grain having either of its two tips swell open partially or completely, or as grains which developed an unnatural square grain tip, rather than the natural rounded tips. Rather than a split appearance, a desirable intact cooked grain has a cooked shape such that the dorsal (back) and ventral (belly, where the embryo is located) sides of the grain remain essentially fused together even if considerable stretching or expansion is noticeable, and the inner endosperm starchy region becomes visible Further, instead of being ragged or fuzzy like a cottonball, the overall surface appearance characterizing intact grain structure is smooth.

Another measure of whether or not the rice grain has an intact structure is to assess the final dry rice product for degree of fissuring. Fissured grains are characterized as having transverse lines running either partially or totally across the width of the grain. No fissuring or minimal (less than 10%) fissuring is preferable, and more preferably, less than 2%.

Fissured rice is undesirable because it can result in breakage of grains during milling or later during cooking, and "brokens" are economically unattractive Moreover, depending upon the extent of the fissures, fissured grains can become "brokens" prior to milling. Broken grains are undesirable because they result in poor milling yields. Multiply-fissured grains can result in multiply fragmented grains, which fragments are smaller and even more difficult to recover in milling. Highly fissured grains also tend to cook-up as non-intact grains, with the resulting cooked rice being fragmented into pieces.

Many analytical techniques are used to assess the quality of the resulting milled rice. The amount of fissuring can be measured as follows: 5 to 10 grams of milled rice are weighed. Fissured grains are identified by visual inspection, segregated and separately weighed. The degree of fissuring is calculated as follows:

$$\% \text{ fissured grains} = \frac{\text{weight of grains with fissure}}{\text{total weight of the sample}}$$

Percent broken grains, which is also a measure of intact grain structure, can be determined either by hand-sorting a given weight of sample obtained from a sample splitter, or by placing 100 grams of milled rice or brown rice in a grain sizing device equipped with two #12/64 indent plates. The plates are positioned at an incline so that upon lateral shaking, the grains roll down the plates. The brokens become trapped in the indents while the whole grains are collected at the bottom of the two plates. Accordingly:

$$\% \text{ brokens} = \frac{(100 - \text{weight of whole grains})}{100 \text{ grams}} \times 100$$

or $$\% \text{ brokens} = \frac{(\text{weight of broken grains from hand-sorting})}{\text{initial weight of sample}} \times 100.$$

Measurement of solids loss upon cooking gives an indication of the amount of soluble and particulate starch removed from the rice grain during cooking in excess water for a given period of time. It is a reflection of the ability of the grain to maintain its intact structure while being subjected to heat in the presence of excess water. Raw or non-parboiled rice normally yields about 1.5 to 2 times the amount of solids loss which do parboiled rice and rice in accordance with the invention. Rice in accordance with the invention, depending upon the variety and retrogradation state, will yield solids loss values about equal to that of conventionally, dry heat-parboiled or steam-parboiled rice.

For instance, in one method to measure solids loss, 25 grams of a rice sample is placed in 250 ml of boiling deionized water. It is simmered for 20 minutes, drained and placed through a sieve. The water is retained. The rice is rinsed with an extra 100 ml. of water. All rinse water is collected including a 25 ml rinse of the cooker pot. The total rinse water is dried to capture all solids. The percent solids is then calculated as follows:

$$\% \text{ solids} = \frac{(\text{weight of dry solids and beaker}) - (\text{wt. of empty beaker})}{25 \text{ g}} \times 100.$$

Gelatinization is another important feature of the invention. When rice is gelatinized due to parboiling, a tougher rice grain is achieved. By "gelatinization", we mean an irreversible physical change that native starch granules undergo when exposed to water and heat. For the starch chemist skilled in the art, it is the process whereby starch granules in contact with water cease to exhibit a birefringence pattern under polarized light when the mixture reaches a critical temperature called the gelatinization temperature (GT). This can be detected by viewing the starch-water sample under a polarizing microscope. The non-gelatinized, native or raw starch granule will show a characteristic light pattern with a dark cross. Upon absorption of water and heating to the gelatinization temperature, the cross disappears. At this point, the granule is said to have lost birefringence and is gelatinized. The starch granules appear swollen and their size or diameter is much bigger than the size or diameter of the native granules.

Starch gelatinization is also manifest in the physical structure of the granules. Native starch granules consist of amorphous and crystalline regions made up of molecules of glucose polymers. When the starch granules absorb water and are exposed to heat, the amorphous regions swell causing instability in the crystalline regions of the granule. This eventually weakens the crystalline regions to the point that they break up and the whole granule becomes amorphous. The starch granule appears very swollen and, at this point, is said to have undergone gelatinization. Gelatinization is an irreversible process. Once it occurs, the starch molecules cannot revert to their original or native amorphous and crystalline configuration.

Thus, gelatinization of rice kernels is typically viewed as the irreversible swelling of starch granules due to the effects of water and heat, resulting in loss of birefringence under polarized light. Such gelatinization can be considered a melting process consisting of three basic steps, namely, (1) diffusion of water into the starch granule, (2) a phase transition of the starch molecule requiring varying levels of moisture and energy, and (3) swelling of the granules. Gelatinization in the context of this invention refers to the disruption of the crystalline structure of the rice starch, usually as a result of steeping in water and heat treating. In effect, gelatinized starch granules are melted together into an amorphous state.

In the practice of the present invention, it is advantageous that the rice kernel be substantially non-crystalline and gelatinous, i.e., appreciably gelatinized. But, this condition does not exclude the continued existence of some of the original crystalline regions. The degree of gelatinization of the rice sample is typically at least about 35% (and conversely 65% still crystalline), preferably about 95% and especially 100%.

It should be noted that retrogradation can follow gelatinization, and is a phenomenon which is advantageously avoided or, at minimum, controlled. The term refers to the reassociation of gelatinized starch molecules, within a granule in an intact structure (such as a rice grain), into tight bundles that renders the molecules less soluble in water. Retrogradation reflects the slow and progressive tendency of starch molecules to come together or associate in cooked foods. The practice of the present invention typically provides a rice product having minimal retrogradation as compared to conventional steam-parboiled rice. This is desirable as minimal retrogradation effectuates a faster cooking rice, all other things being equal, because non-retrograded starch is less resistant to water absorption than highly retrograded rice upon cooking.

Equilibrated moisture content of milled rice upon soaking in water is a test which is used to obtain a rough measurement of the degree of gelatinization of parboiled rice. It is based on the phenomenon that gelatinized starch granules can absorb much more water at room temperature than non-gelatinized starch granules. For example, raw or nonparboiled rice typically has an equilibrated moisture content of about 40 percent dry basis, but parboiled rice from the same variety will yield an equilibrated moisture content of about 100 to 200 percent depending upon processing conditions. While determining equilibrated moisture content is a convenient and useful way of determining the degree of gelatinization, it is not an absolute measure of that parameter. This is because the equilibrated moisture content is affected by the extent of retrogradation which gelatinized starch undergoes during cooling and drying. For instance, non-retrograded rice can have an equilibrated moisture content of 180, but if it is allowed to undergo extensive retrogradation, for example, as a result of tempering the partially dried rice for two hours at 75° C., the equilibrated moisture content of the final product can be as low as 100. Thus, when utilized, equilibrated moisture content should not be accepted uncritically, but rather in the context of the conditions prevailing at the time of testing.

The following example will illustrate how to measure the equilibrated moisture content. Four grams of rice are weighed and then soaked in 100 milliliters deionized water for 24 hours at room temperature. The soaked rice is drained and patted dry with tissue paper and then weighed again. The wet rice is dried at 100° C. for 24 hours, desiccated and weighed. The equilibrated moisture content is calculated as set forth below:

$$EMC \% \text{ dry basis} = \frac{(\text{wet weight} - \text{oven dried weight})}{\text{oven dried weight}} \times 100.$$

Measuring moisture absorption is useful. Percent water absorption represents the total amount of moisture in cooked rice after cooking in excess water for a given period of time. In a 100 gram sample of rice, percent water absorption can be calculated as follows:

$$\frac{\% \text{ water}}{\text{absorption}} = \frac{(\text{weight cooked} - 100 \text{ g}) + (\text{weight of initial moisture content})}{\text{weight of cooked rice}} \times 100.$$

Also, the firmness or softness of rice can be measured by a shear-testing device. Shear of cooked rice is inversely related to water absorption. The higher the water absorption, the softer the rice is, and vice versa. Thus, cooked rice shear can also be determined as a measure of the softness or firmness of the cooked rice, and indirectly the amount of water absorption.

In one useful way of measuring shear value, 250 grams cooked rice is placed in mason jars and allowed to cool for 2 hours at room temperature. Then 100 grams of the cooked rice is placed in a shear press cell. The force (in kilograms) required to extrude the rice through the cell by shear blades is equal to the shear of the cooked rice. Shear value is read from a meter.

Another advantage, which flows particularly from the use of brown rice as a starting material, is that the parboiled rice product made from it is substantially free of "paddy hull solubles". These solubles include any species such as ions, molecules, color bodies, proteins, residual pesticides, etc., that normally resides in paddy rice hulls, or that normally comprises a contaminant rendered soluble in water during the process of steeping of the paddy rice at a temperature ranging from ambient to that conventionally viewed as a steeping temperature, i.e., 55°–75° C. Paddy hull solubles are substances capable of migrating into the inner endosperm of the rice grain through bran layers during the steeping process. They cause various types of browning effects other than Maillard-browning, and also impart typical "parboiled" flavor notes. Such substances are typically detectable in the spent steeping water some time during, and at the end of, steeping cycles Substantial freedom from paddy hull solubles reduces to a negligible level the possibility that extraneous materials will be deposited in the rice product and adversely affect the beneficial features otherwise imparted by the practice of the invention.

An especially important feature of a rice product in accordance with the invention is the substantial freedom from Maillard-browning effects, and in the case of brown rice other types of browning effects as well. The expression Maillard-browning effects refers to darkening or discoloration of the rice grains or kernels due to the formation of colored substances brought about by the Maillard reaction; similarly, other types of browning effects are caused by pigment absorption or adsorption, by oxidation or polymerization of colorless phenolic compounds in the rice to produce colored pigments, or by enzymatic browning reactions in conventional parboiling practices, the resulting milled rice exhibits colors ranging from yellow to light brown, to orange brown, to dark brown or even to almost black. As previously mentioned, the typical color of parboiled rice is darker than the majority of global consumers find acceptable. This unacceptable color leads to consumer rejection of conventionally parboiled rice. In contrast, the substantial freedom from Maillard-browning effects, and especially from other types of browning effects as well, confers upon the rice product of the invention a corresponding color improvement. It follows that this should increase consumer-acceptance.

The expression "substantially free of browning effects" (whether Maillard-browning or some other type) refers to that condition in which milled rice obtained in accordance with the present invention is whiter or lighter in color relative to a typical specimen of conventionally parboiled rice. It should be noted that rice which is substantially free of browning effects may nonetheless darken in color if subjected to prolonged heat treatment such as in long-drying times at high temperatures.

ASTM E 313-73 (Reapproved 1979), entitled "Indexes of Whiteness and Yellowness of Near-White, Opaque Materials" promulgated by the American Society for Testing and Materials (1916 Race Street, Philadelphia, Pa., USA) provides a suitable test by which the color of the rice product of the present invention, vis-a-vis that of typical parboiled rice, can be evaluated. Generally speaking, the ASTM standard prescribes a yellowness index which can be used to arrive at a single number characterizing the deviation from the preferred white color. Using the yellowness index, commercially purchased unparboiled rices range from 35.1 to 39.2, commercially purchased parboiled rices range from 59.4 to 67.0, and the product of this invention preferably ranges up to 54.5. In particular, the product of this invention has a maximum yellowness index of 55.0.

In carrying out an analysis according to the aforementioned ASTM standard, the color of each rice product can be measured using a Hunter Colorimeter, from Hunter Associates Laboratory, Inc. (11495 Sunset Hills Road, Reston, Va., USA). The meter is a tri-stimulus response device which yields the three traditional color value readings (L, a, b). The "L" scale ranges from 0 to 100, from pure black to pure white, respectively. The "a" value can either be positive or negative, indicating intensity of the red and the green hues, respectively. The "b" value indicates the strength of yellow hue when positive, and the blue hue when negative.

When rice is thermally abused, it darkens such that the "L" value gets lower. It also gets more yellow such that the "b" value increases. And, it also gets more red, such that the "a" value increases. These changes do not happen in unison; and, so, reliance only on one of the three values alone as a measure of deviation from natural white color is not advisable.

The above-mentioned standard specifies a yellowness index as follows:

$$YI_{ASTM\ D\ 1925} = \frac{100 \times (1.28 \times X_{CIE} - 1.06 \times Z_{CIE})}{Y_{CIE}}$$

As the yellowness index value increases, the sample is judged to be further away from white, and increasing in perceived yellowness. The tri-stimulus X, Y, Z values are known to those skilled in the art as the CIE X, Y, Z scale for the CIE 1931 2⁰ Standard Observer The relationships between the Hunter L, a, b scale and the CIE X, Y, Z scale are as follows:

$$L = 10 \times Y^{(\frac{1}{2})}$$

$$a = \frac{17.5 \times [(X/.98041) - Y]}{Y^{(\frac{1}{2})}}$$

$$b = \frac{7.0 \times [Y - (Z/1.18103)]}{Y^{(\frac{1}{2})}}$$

The ASTM standard states, in relevant part, "1.2 For complete analyses, white colors must be measured, as must all other colors, by some three-number system. Frequently, graphical relationships between white colors are shown on a two-dimension lightness ["L" value] yellowness ["b" value] diagram in which the generally unimportant (for whites) red-green dimension is omitted For many problems involving color quality evaluations of white materials, one does not require either three- or two-dimensional analysis of white colors Rather, one needs for each such problem to measure only the single specific attribute important to him . . ."

By using the yellowness index, which appropriately combines contributions from all three tri-stimulus values, we can arrive at a single number which describes deviation from the preferred white The ASTM standard further states, "5.2 This is a psychophysical test method; that is, the procedures specified [i.e., the equations] are designed to yield numbers correlating with visual estimates made under one set of typical observing conditions . . ." An examination of the numerical ratings, set forth heretofore regarding commercially purchased unparboiled rices (35.1-39.2), commercially purchased parboiled rices (59.4-67.0), and the rice product of the present invention (up to 54.5), shows that commercially purchased unparboiled rice is closest to white—though it suffers from other shortcomings such as broken grains and non-intact cooked appearance. Commercially purchased parboiled rice, while exhibiting intact grain structure, is furthest from white. A rice product of the invention made from a brown rice starting material combines the strengths of both of the foregoing insofar as it exhibits intact grain structure, is free from characteristic parboiled taste and has a color which approaches the near-whiteness of unparboiled rice.

The foregoing assumes that, for purposes of comparison, each of the heat-treated products is processed to a "degree of milling" loss of about 10% of original rice feed (to the mill). This is because browning effects in heat-treated milled rice can be altered by varying the amount of milling. Milling, sometimes referred to as whitening, abrasively (and/or through friction) removes layers of matter from the surface of rice. When milling first begins on brown rice, whether it is heat-treated or not, a rapid change in the whiteness of the rice occurs, as most of the bran is removed at first. Since the division between where the darker bran stops and the whiter starchy endosperm starts is not easy to separate cleanly, there is a transition zone or color gradient Further, other color gradients are present, including presence of other-than-starch materials, such as protein and fat. Also, during steeping in the parboiling process, it is widely accepted that sugars, coloring matter, pigments and other soluble substances (called "bran solubles") are moved somewhat from the bran into the upper layers of the endosperm; some of these substances actually have a higher tendency to brown than the native endosperm. The upper, darker layers can be reduced with deeper milling, allowing the rice to be whiter. Thus, the miller can undermill and increase his milling yield (improving economics), but get a darker product. Conversely, the miller can overmill or deep mill, and lose yield but whiten the product. As will be appreciated, normalizing the degree of milling standardizes the whitening effect contributed by that measure, so as to ensure the integrity of the comparison.

A principal benefit of the invention is the minimization of browning effects without the need for use of counterbrowning agents or counterbrowning measures. Typically, in practicing the invention, the skilled worker can eliminate all need for intentional introduction of counterbrowning agents, and though some may be present in incidental amounts (on the order of say, 0.1 weight % or so) as a result of extraneous processing considerations or the like, the amount is zero or close to zero. Similarly, there is typically no need for counterbrowning measures of the type discussed above, and typically none is carried out. Nevertheless, it may be that other processing steps entail performance of acts which are also counterbrowning measures, and rice product made using these steps but which would be free of browning effects even if they were not performed, will still fall within the broad invention. Counterbrowning agents are substances that inhibit browning reactions, or mask browning effects, in the rice completely or at least to an appreciable extent. Examples include sulphites and ascorbic acid. A counterbrowning measure is any condition or set of conditions which, when the rice is exposed thereto, leads to the destruction, inactivation or blocking of one or more enzymes or compounds that otherwise participate in a browning reaction, or one or more precursors of such enzyme(s) or compound(s). For example, a piece of biological material including an enzyme may be exposed to sufficient heat to render the enzyme denatured, or rough rice may be steeped in a highly acidic environment that disfavors the Maillard reaction. The obviation of the need for counterbrowning agents and/or measures is beneficial because it reduces expense due to material or processing economics, and further eliminates the presence of extraneous substances which may affect flavor, aroma, nutritional or other properties of the rice adversely.

The inventive product is prepared by steeping brown rice in water to impart a moisture content sufficiently high that the rice starch is capable of being fully gelatinized. Steeping can be carried out in any suitable manner, and conventional methods will suffice. Receptacles such as tanks and screw-type steepers can be utilized, but the invention can be practiced with any receptacle sufficiently large to accommodate the amount of rice and water desired. The water may contain various vitamins or other desirable additives which are sought to be incorporated in the rice, but this is not essential. After steeping, the rice can be allowed to drain—for instance, on a screen of appropriate mesh size (such as U.S. #10 mesh) - for a time period, say, 2-5 minutes, which is sufficient for the removal of excess water. Preferably the moisture content after steeping is about 30-38 percent, wet basis. To measure the percent water content of a sample of rice grains, any suitable method can be employed. In a preferred method used for steeped rice (as well as steamed rice and final rice moisture), a given weight of wet rice is oven dried at 100° C. The initial weight loss is calculated. The oven dried sample is then ground in a mill and a ten gram sample is collected in a metal cup, weighed and dried in an oven for final moisture determination. The moisture content is calculated as follows:

% moisture content =

$$\frac{\text{(initial wet weight)} - \text{(initial dried weight)} + \text{(initial dried weight)} - \text{(final dried weight)}}{\text{(initial wet weight)}} \times 100.$$

The value of the moisture content as measured above reflects the total moisture content. If the rice is patted-dry with a tissue or other absorbent material prior to measurement, a moisture content minus surface water results.

The rice is gelatinized by exposure to a hot gaseous medium flow. This flow is at a temperature, and the rice is exposed to it for a time, such that not only is the rice starch gelatinized, but further, the surface of the rice is dried in substantial part. After it is exposed to the hot gaseous medium flow, the rice preferably has a moisture content of about 20-30 percent, wet basis.

The hot gaseous medium flow is preferably such that any free water on the exterior of the rice remaining from steeping, or condensed upon the surface of the rice during the gaseous medium contact, is substantially removed by drying, by the physical removal action of the gaseous flow, or both.

Hot gaseous medium flow generally can be characterized by its velocity, temperature, flow pattern, flow rate, and pressure. The hot gaseous medium is preferably hot air or steam, but can be any other suitable gas or gas mixture (including air and steam) which is sufficient to perform the functions identified above but which is inert to (i.e., does not adversely affect the properties of) the rice product of the invention. Advantageously, when the hot gaseous medium is hot air, it is at a temperature of 150°-200° C., the flow at a superficial velocity of 100-300 meters per minute, and the rice exposed to the flow for 15-40 seconds under a pressure of 0-380 kpag. When the hot gaseous medium is steam, it is advantageously at a temperature of 105°-200° C., the flow at a superficial velocity of 1-100 meters per minute, and the rice preferably exposed to the flow for 5-40 seconds under a pressure of 0-380 kpag.

The "flow" of "hot gaseous medium" is the continuous movement of gaseous molecules (e.g., steam, air, or steam and air) around an individual rice grain or a mass or plug of rice grains. Flow implies velocity and, in certain embodiments, when the velocity of the hot gaseous medium flow is increased such that the entire bed of rice is suspended, and every particle is surrounded by gas, then there is fluidization. However, fluidization is not necessary for the practice of the invention. In general, fluidized behavior is used in the hot air approach whereas packed beds are used in the steaming approach.

The hot gaseous medium flow can be co-current, counter-current or mixed flow vis-a-vis the rice flow, as well as the steam which is liberated from the rice during gelatinization, depressurization and drying. The flow can be laminar or turbulent, but preferably turbulent, and is specifically characterized by an engineering index called the Reynolds Number (Re). It is a dimensionless number which increases as turbulence increases. In general, the hot gaseous medium flow falls into one of two categories: either hot air flow (i.e., hot air drying) used in atmospheric processing, or hot steam flow (or flow of a hot steam/air mixture) used in pressurized processing.

Especially when utilizing brown rice, it is noteworthy that in atmospheric processing, because of the presence of intact bran layers, a certain amount of gaseous water molecules remain trapped in the endosperm and starch granules Pressure builds up inside the grain. However, the pressure is such that it does not exceed the rupture point of the bran layer. The pressure build-up indicates enough moisture is available to the starch granules to effect gelatinization. This happens in a matter of 5 to 40 seconds. Internal grain pressure gradually releases when the rice is removed from the flow of hot air, or when the rice is allowed to dry.

In pressurized processing (typically steaming) of brown rice, a somewhat different dynamic pertains. During steaming, the steam first condenses on the surface of the rice, releasing its heat of condensation. The rice will warm, typically to a temperature of from 50° C. to 200° C.; the amount of steam required to warm the rice can be easily calculated using conventional thermodynamic equations. But, the wet condensate on the surface of the rice can have a severely deleterious effect on the "handleability" of the rice if the condensate is absorbed. The absorbed condensate swells the upper layers of starch, eventually causing the bran layer to burst and the starch to exude from the grain. This can cause equipment shut-down (from starch build-up on equipment surfaces, etc.). Therefore, it is important for the steaming process to be conducted in a sufficiently brief amount of time (about 10–30 seconds as opposed to normal parboiling time for paddy rice, about 10 minutes) that the condensate does not have time enough to absorb into the grain A further precaution which can be employed is to conduct the steaming process in such manner as to sweep away any condensate formed. In this case, the rice, which has been heated to the processed temperature, has no condensate on its surface. When pressure is released to the atmosphere, the rice cools down to 100° C. (i.e., the boiling point of water at atmospheric pressure). For this to happen, some heat energy is transferred to the steeped moisture contained in the rice, which is vaporized and escapes. Thus, not only is the possibility of undesirable excess absorbed moisture thwarted, but, in addition, the rice beneficially dries itself, especially on its surface.

Surface drying is quite beneficial when brown rice is the starting feed for parboiling using steam as the gaseous media. Surface drying results in the absence of surface moisture thereby curtailing "uncontrolled gelatinization" especially of the starch granules on the outer endosperm. Uncontrolled gelatinization is often accompanied by rupture or breakdown of the starch granule. The bran layers are ruptured and intragranular starch material is exposed. Surface drying of brown rice minimizes such damage and allows for smoother material flow of the heat-treated grains through the heat treating device and through further equipment.

The temperature of the hot gaseous medium is measured using an appropriate thermocouple. The thermocouple can be held in place by a small conduit communicating with the pipes of the vessel in which the parboiling occurs. It will be appreciated that temperature is also a function of prevailing pressure, and that it is accordingly desirable to monitor pressure during pressurized processing embodiments of the present invention. For instance, if saturated steam is used as the medium in a pressurized steaming operation, then pressure gauges can be installed at appropriate locations in the apparatus as known to those skilled in the art. Another factor which may influence measurements of temperature of the hot gaseous medium is heat radiating from external sources. For example, an unshielded thermometer or thermocouple in a gas stream, in the proximity of a surface having a temperature higher than that of the gas stream, will signal a higher temperature then the true gas stream temperature. Therefore, to compensate for the effects of radiated heat, shielding of the measuring elements is preferably employed to promote accurate measurements of gas temperatures. To measure the temperature of the rice grain or the temperature of the wall of the vessel, an appropriate thermal probe can be used as known to those skilled in the art.

The flow conditions of the gaseous medium, such as pressure and velocity, can be measured with a pilot tube or with an anemometer. One way of determining velocity is to calculate a "superficial velocity" in which the flow (in volume units per time, e.g., cubic feet per second or ft$^3$/sec) is divided by the area through which the flow occurs (e.g., square feet or ft$^2$).

Of course, additional processing steps may be incorporated in the practice of the invention. For example, the heat-treated rice can be subsequently tempered at about 70°–110° C. for about 15–120 minutes. Additionally, the rice can be further dried, for instance, to a moisture content of about 11–13 percent, wet basis. Also, the rice can be conditioned after these treatments, at about ambient temperature to about 45° C. for about 3–6 hours, if desired. As is customary with rice, it can then be milled.

The present invention is further described and illustrated in the following examples It will be appreciated that these examples are provided solely for illustrating the invention and not for the purpose of limitation. It will further be appreciated that variations and modifications to the product and process can be made by the skilled worker without departing from the spirit or scope of the invention as defined in the appended claims.

EXAMPLES

A sample of brown rice, Lemont variety, was steeped in water at 70° C. for 90 minutes. The EMC of the brown rice was measured and found to be 39.3. The steeped rice was dewatered by allowing the rice to drain for 2 minutes on a mesh screen. In this wet state, the rice was not free-flowing and was relatively difficult to handle. The moisture minus surface water of the rice was measured and found to be 31.4%. The dewatered rice was then split into four portions.

Example 1 (not in accordance with the invention):

A first portion of rice was placed into a hot air dryer. The rice was exposed to a flow of hot air such that the rice became fully fluidized. The temperature of the inlet air to the rice drying section was set at 95° C. The exhaust from the section was 90° C. The treatment was conducted for twenty seconds. At the end of the treatment, the rice was removed from the dryer. The rice was free of clumps and flowed easily. The average total moisture of the rice was about 26.4%. However, it was not gelatinized, as indicated by its EMC value which was found to be 43.6, essentially equal to that of the initial raw rice. The rice was then dried, milled and cooked for consumption. The cooked grains were found to be non-intact. The color of the milled rice was white. The flavor was free of characteristic parboiled taste.

Example 2 (in accordance with the invention):

A second portion of the steeped rice described above was placed into the same hot air dryer as in Example 1 The rice was then exposed to hot air, which had an inlet temperature of 190° C. and an exhaust temperature of 180° C., and full fluidization of the rice grains was attained. The exposure time was twenty seconds. At the end of the treatment, the rice was essentially 100% gelatinized as evidenced by an EMC value of 209. No clumps were found in the rice. The moisture content after exposure was found to be 21.6%. The rice was then dried, milled and cooked for consumption. The color of the milled rice was white. The flavor was free of characteristic parboiled taste. The cooked grains were intact.

Example 3 (not in accordance with the invention):

A third portion of steeped rice described above was placed into a steaming vessel equipped for pressure control. The steamer was designed such that the amount of liquid water formed from condensation of steam on the vessel walls is minimized. Steam was applied at a saturated steam pressure of 10 psig for 10 minutes. During the initial pressurization, the flow of steam was considerable due to the need to heat both the rice and the vessel to the temperature of the saturated steam. After the targeted pressure of 10 psig was achieved, the flow of steam was decreased to a negligible rate, with additional steam being introduced only to maintain the target pressure. After the ten-minute period, the pressure was released and the rice was removed from the steaming vessel. The grains were gelatinized as evidenced by an EMC of 114.9. The percent of clumped grains is counted as a measure of grain damage and of flowability/handleability. The count indicated that about 17.2% of the grains were in the clumped condition. A clumped condition is defined as two or more rice grains which are stuck together and do not break apart easily. The moisture content of the rice was measured and was about 32.8%. The rice was dried, milled and then cooked for consumption. The grain structure was found to be intact. The flavor was free of characteristic parboiled taste. The color of the milled rice was white.

Example 4 (in accordance with the invention):

A fourth portion of rice described above was placed into the steaming vessel described above in Example 3. In this instance, the targeted pressure was 30 psig to be applied for a time period of 20 seconds. The steamer was operated such that a considerable amount of steam was allowed to flow through the packed bed of rice. After twenty seconds, the rice was removed from the vessel. The grains were substantially 100% gelatinized as evidenced by an EMC of 192.1. Grain clumps were measured. The count indicated that about 1.2% of the grains were in the clumped condition. The moisture of the rice was measured and found to be 29.5%. The rice was then dried, milled and cooked for consumption. The color of the milled rice was white. The cooked grains were intact. The flavor of the rice was free of characteristic parboiled flavor.

DISCUSSION

* The purpose of Example 1 is to illustrate that the steeped rice can be dried so that it is free flowing but not gelatinized. The color of the milled rice is white, but it has a poor cooked grain structure.
* By way of contrast, in Example 2, gelatinization is achieved when the drying conditions are in accordance with the present invention. The color of the milled rice is white and it has an intact cooked grain structure.
* In Example 3, it is shown that steaming can effect gelatinization, but that poor "handleability" can result. The color of the rice is white and it has an intact cooked grain structure.
* In Example 4, it is shown that steaming in accordance with the invention can yield rice which is both gelatinized and free flowing. The color of the rice is white and it has an intact cooked grain structure.

| Example | Gelatinized? | Brown Rice Feedstock | | | Free of Parboiled Flavor |
| | | Free Flowing? | White Color? | Intactness | |
| --- | --- | --- | --- | --- | --- |
| 1 | NO | YES | YES | NO | YES |
| 2 | YES | YES | YES | YES | YES |
| 3 | YES | NO | YES | YES | YES |
| 4 | YES | YES | YES | YES | YES |

The terms and expressions utilized herein are intended as terms of description, not limitation, and there is no intention in the use of such terms or expressions of excluding any equivalents of the features shown and described as portions thereof, its being recognized that various modifications are possible within the scope of the invention.

We claim:

1. A milled parboiled rice product from a brown rice feedstock which comprises a rice grain having an intact grain structure and a gelatinous kernel which is substantially non-crystalline, said rice product being substantially free of Maillard-browning effects, without the need for the rice grains's exposure to counterbrowning agents or counterbrowning measures to effect said freedom from Maillard-browning effects, and said rice product having a maximum yellowness index of 55.0.

2. A parboiled rice product as defined in claim 1, wherein the product is at least about 35% gelatinized.

3. A parboiled rice product as defined in claim 2, wherein the product is at least about 95% gelatinized.

4. A parboiled rice product as defined in claim 1, wherein the product has an equilibrated moisture content at least about 100.

5. A parboiled rice product as defined in claim 4, wherein the product has an equilibrated moisture content at least about 180.

6. A parboiled rice product as defined in claim 1, wherein less than about 10% of the rice includes fissured grains.

7. A parboiled rice product as defined in claim 6, wherein less that about 2% of the rice includes fissured grains.

8. A parboiled rice product as defined in claim 1 which yields solids loss values approximately equal to solids loss values of parboiled rice.

9. A parboiled rice product as defined in claim 1 which is substantially free of a characteristic parboiled flavor.

10. A method for the preparation of parboiled rice, which comprises (a) steeping brown rice to a moisture content sufficiently high that the rice starch is capable of being substantially fully gelatinized; and (b) exposing the rice to a hot gaseous medium flow at a temperature and for a time such that the rice starch is gelatinized and the surface of the rice is dried in substantial part, wherein the hot gaseous medium is hot air.

11. A method as defined in claim 10, wherein the hot air is at a temperature of 150°–200° C., the flow is at a superficial velocity of 100–300 meters/minute, and the rice is exposed to the flow for 15–40 seconds under a pressure of 0–380 kpag.

12. A method as defined in claim 10, wherein the hot gaseous medium flow is such that any free water on the exterior of the rice, remaining from steeping, or condensed thereupon during the gaseous medium contact, is substantially removed by drying, by the physical removal action of gaseous flow, or both.

13. A method as defined in claim 10, wherein the rice is steeped to a total moisture content of about 30–38%, wet basis.

14. A method as defined in claim 10, wherein the rice is exposed to a hot gaseous medium flow until the rice has a moisture content of about 20–30%, wet basis.

15. A method as defined in claim 10, which further comprises tempering the rice at about 70°–110° C. for about 15–120 minutes.

16. A method as defined in claim 15, which further comprises drying the rice to a moisture content of about 11–13%, wet basis.

17. A method as defined in claim 16, which further comprises conditioning the rice at about ambient temperature to about 45° C. for about 3–6 hours.

18. A method as defined in claim 17 which further comprises milling the rice.

* * * * *